United States Patent Office 2,763,126
Patented Sept. 18, 1956

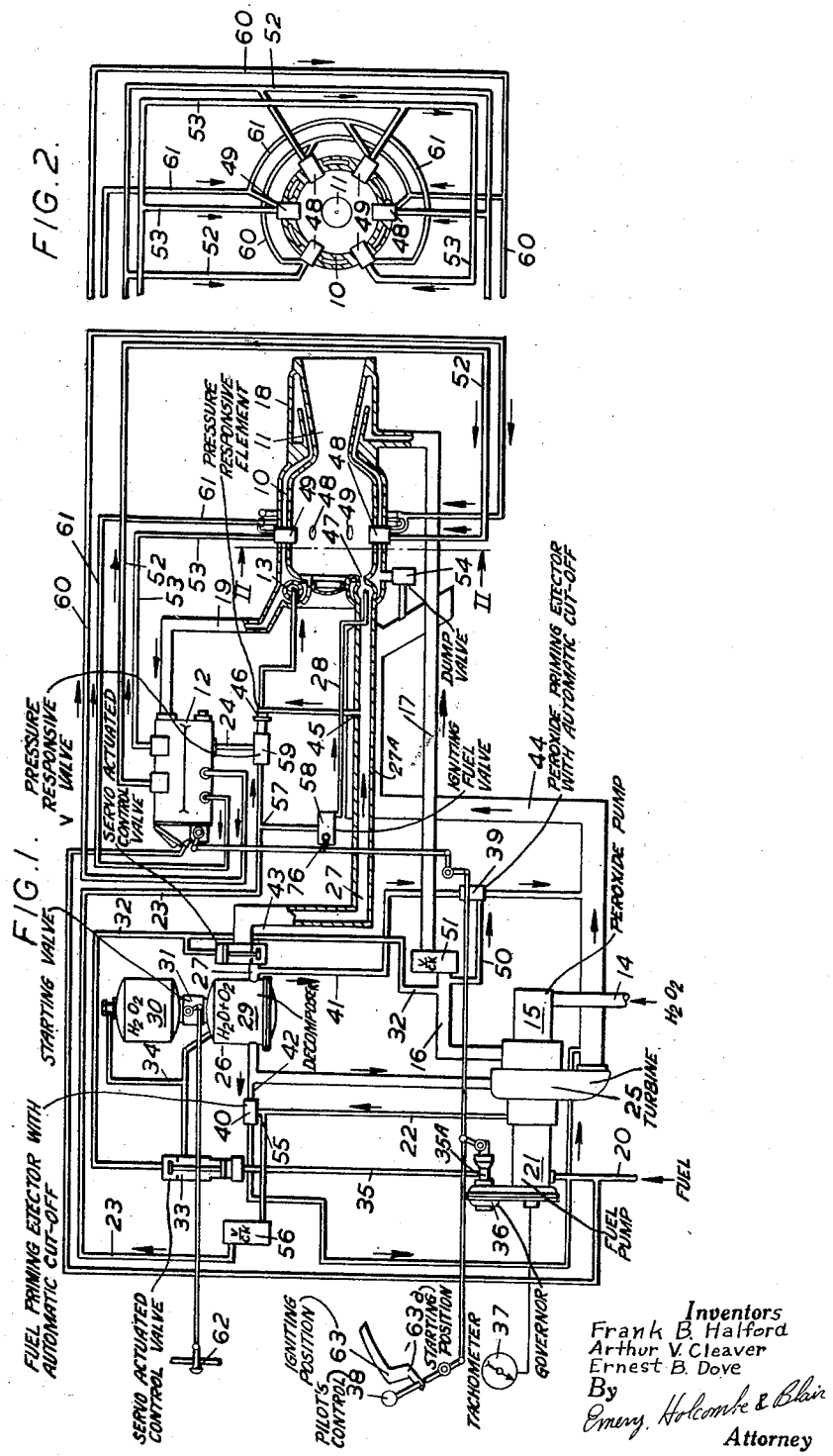

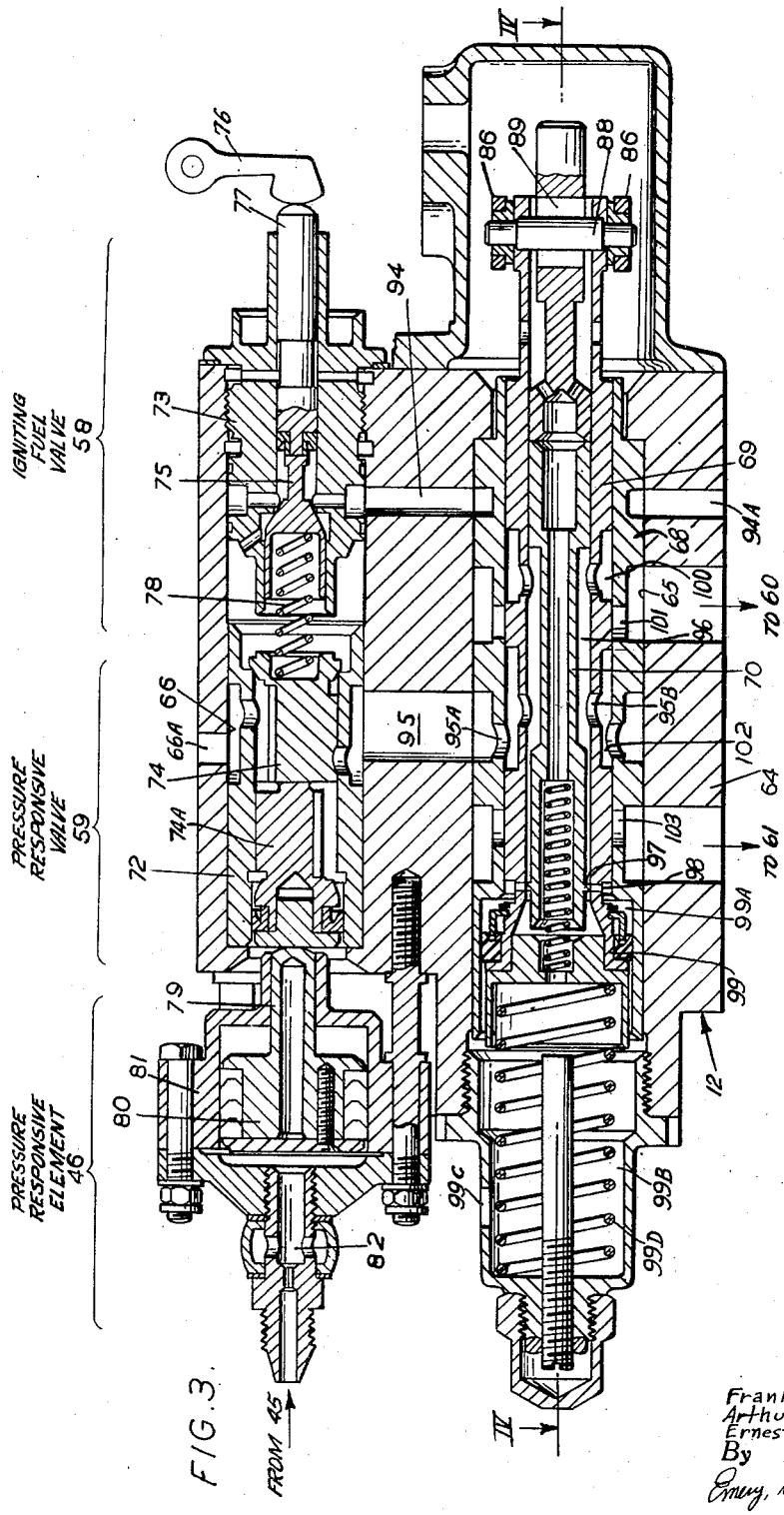

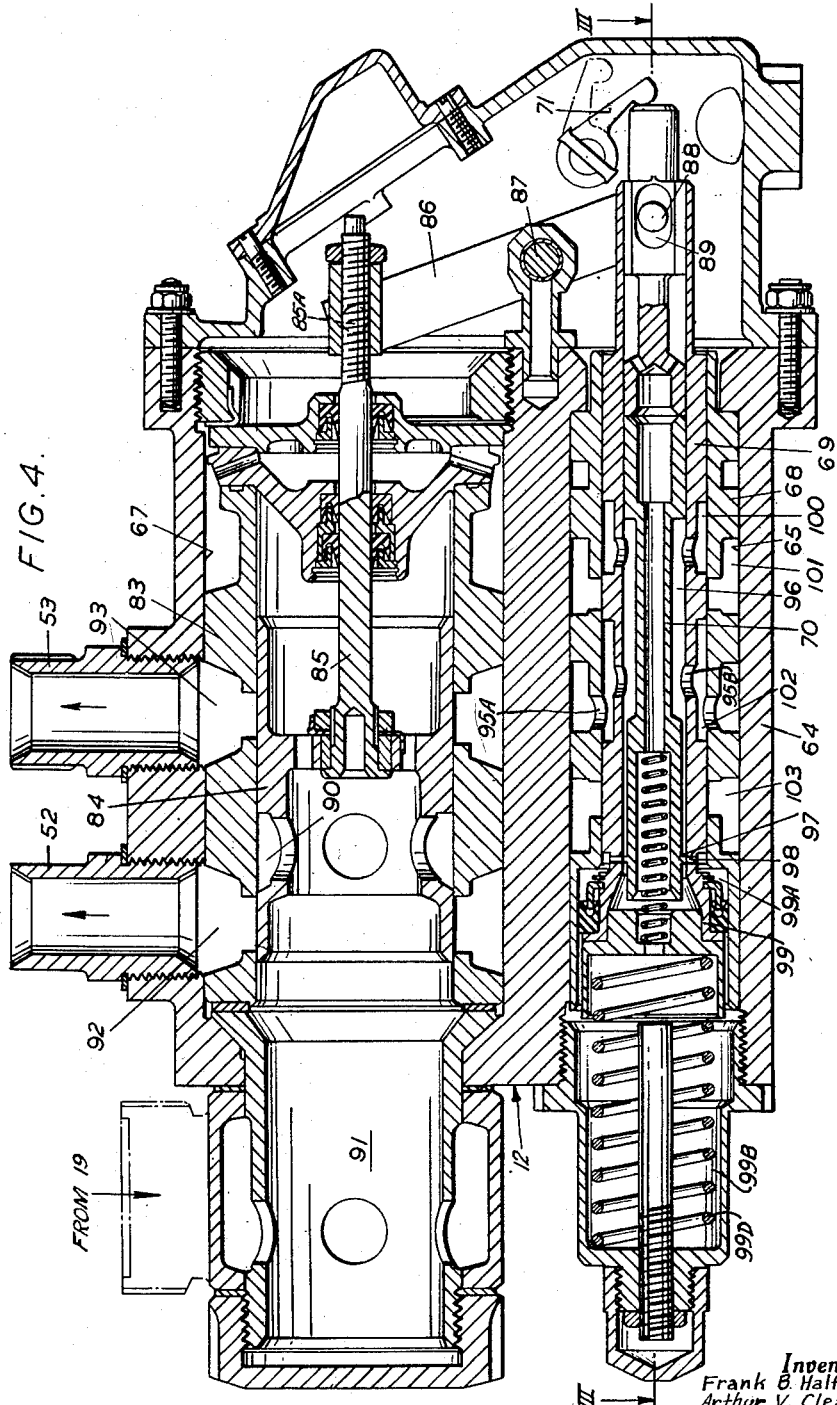

2,763,126

FUEL FEEDING AND IGNITION MEANS FOR ROCKET MOTORS WITH NON-SELF-IGNITING PROPELLANTS

Frank Bernard Halford, Edgware, Arthur Valentine Cleaver, London, and Ernest Baker Dove, East Barnet, England, assignors to The De Havilland Engine Company Limited, Edgware, England, a company of Great Britain Application February 25, 1952, Serial No. 273,263

7 Claims. (Cl. 60—35.6)

This invention relates to rocket motors intended primarily for the propulsion of aircraft and of the type wherein combustible propellants which are not self-igniting are pumped into a combustion chamber, their combustion being initiated by the pre-combustion of relatively small quantities of combustible substances in an ignition chamber communicating with the combustion chamber. The combustion products from the ignition chamber pass to the combustion chamber at a temperature high enough to ignite the propellants, and all the combustion products issue from a nozzle at the rear of the combustion chamber at high velocity and with propulsive effect.

According to the present invention, in a rocket motor of the type specified, a gas containing free oxygen is produced for driving propellant pumps and a portion of this gas constitutes one of the combustible substances admitted to the ignition chamber. Conveniently the oxygen-bearing gas is produced by the decomposition of an oxygen-containing substance such as hydrogen peroxide, but if preferred it may be produced by any other suitable chemical reaction.

It will be appreciated that when starting the rocket motor it is desirable that the pre-combustion should be properly established in the ignition chamber before the propellants begin to enter the combustion chamber, since otherwise propellants might accumulate in the combustion chamber with a consequent danger of explosion. Thus, one form of the invention includes means responsive to the pressure in the ignition chamber for preventing the introduction of the propellants into the combustion chamber until a predetermined pressure has been built up in the ignition chamber due to combustion therein.

Similarly it is desirable that the two or more propellants should enter the combustion chamber substantially simultaneously since otherwise an accumulation of one of them might arise with perhaps a consequent danger of explosion on the introduction of another. It is also desirable to regulate the flow of the propellants to the combustion chamber in order that the thrust may be controlled to a certain extent. Thus the means responsive to the pressure in the ignition chamber may be arranged to admit one of the propellants to a regulating valve which is actuated by the pressure of this propellant but is subject to external control, and this regulating valve may not only regulate the admission of this propellant to the combustion chamber in dependence on the external control but may also regulate the admission of the other propellant or propellants.

The external control may also actuate a valve for admitting a combustible substance to the ignition chamber for combustion therein with the oxygen-bearing gas.

It may be convenient for one or more of the combustible substances admitted to the ignition chamber to be the same as one or more of the propellants, but this is not essential.

The invention may be carried into practice in various ways but one particular embodiment intended for use as a main or auxiliary propulsion unit in an aircraft will be described by way of example with reference to the accompanying drawings, in which:

Figure 1 is a diagram showing the general arrangement of the propulsion unit,

Figure 2 is a diagrammatic section on the line II—II in Figure 1,

Figures 3 and 4 are two different longitudinal sections through the regulating valve assembly taken on section planes III—III and IV—IV in Figures 4 and 3, respectively.

The propulsion unit shown in Figures 1 and 2 includes a combustion chamber 10 having a nozzle 11 at its rear end and into which are injected two propellants, namely, an oxidizer, for instance hydrogen peroxide, and a fuel, for instance a hydro-carbon such as kerosene or gasoline. These propellants are both supplied through a main regulating valve 12 which controls their admission. The propellants are not self-igniting and their ignition in the combustion chamber is initiated by hot combustion products issuing from an annular ignition chamber 13 arranged adjacent to the forward end of the combustion chamber 10.

Hydrogen peroxide is drawn from a tank (not shown) through a pipe 14 into a centrifugal pump 15 and is delivered through pipes 16 and 17 into a cooling jacket 18 surrounding the combustion chamber 10 and the ignition chamber 13. From the cooling jacket it passes through a pipe 19 into the regulating valve 12. The fuel is drawn from a tank (not shown) through a pipe 20 into a centrifugal pump 21 and is delivered to the main regulating valve 12 through pipes 22, 23 and 24.

The centrifugal pumps 15 and 21 are driven by a common turbine 25. The turbine 25 is driven by a mixture of steam and oxygen produced by the decomposition of hydrogen peroxide in a steam generator 26 containing a catalyst. Not all the steam and oxygen mixture produced in the steam generator feeds the turbine, as a portion of it is tapped off through a pipe 27 and is passed to the ignition chamber 13 to form one of the substances used for pre-combustion. The steam and oxygen mixture is produced at a temperature of about 500° C., so that when it enters the ignition chamber it is still hot enough to ignite a stream of fuel which is also introduced into this chamber through a pipe 28. The hot combustion products from the ignition chamber then pass into the combustion chamber 10 to ignite the propellants.

The unit includes various refinements and control devices which will be described in more detail below.

The steam generator 26 consists of two vessels 29 and 30 arranged one above the other with a valve 31, herein termed the starting valve, between them. The lower vessel 29 contains the catalyst for decomposing the hydrogen peroxide, which may be in the form of solid porous stones impregnated with a substance such as a manganese compound, while the upper vessel 30 acts as a reservoir of hydrogen peroxide for starting purposes.

A tapping 32 taken from the hydrogen peroxide pipe 16 communicates with both the upper and lower vessels of the steam generator through a peroxide control valve 33 and a T junction 34, one branch of which goes to the upper vessel 30 and the other branch to the lower vessel 29. Thus once the hydrogen peroxide pump 15 has begun to operate it will deliver hydrogen peroxide to the upper vessel 30 to replace that which was used in starting, and to the lower vessel 29 to keep up the supply of steam and oxygen mixture to the turbine. The peroxide control valve 33 is connected by an impulse pipe 35 to a throttle valve or other conventional device 35A actuated by the governor 36, which is driven from the common shaft of the turbine 25 and the pumps 15 and 21, the arrangement being such that the peroxide control valve 33 is adjusted by the governor through the valve 35A and the impulse pipe 35 to maintain a supply of hydrogen peroxide to the steam generator 26 sufficient to drive the turbine and pump unit at the speed to which the generator is set. A tachometer 37 indicates the speed of the turbine and pump unit.

The speed setting of the governor 36, i. e., the loading of the governor spring can be adjusted by a pilot's control 38 so that the speed of the turbine and pump unit can be suitably controlled.

In order to ensure priming of the two centrifugal pumps 15 and 21 on starting, two priming ejectors 39 and 40 are provided which are actuated by steam and oxygen mixture tapped off from the main supply through pipes 41 and 42 respectively. These ejectors ensure that once steam and oxygen generation has begun, air will be drawn from the pumps so that they will begin pumping liquid almost at once. As soon as liquid reaches the ejectors 39 and 40 the steam and oxygen supply to them is automatically cut off by a suitable cut off device. The portion of the steam and oxygen mixture tapped off from the steam generator through the pipe 27 which does not go to the turbine or to the ejectors is passed through a pressure sensitive flow control valve 43 on its way to the ignition chamber. To reduce heat losses the pipe 27 is jacketed for part of its length 27A with the exhaust from the turbine, which is led thereto through a pipe 44.

In addition to the main flow of the steam and oxygen mixture to the ignition chamber, there is an auxiliary bleed which is taken from the main flow at 45 and passes through a pressure-responsive element 46 (see Figure 3) on its way to the ignition chamber 13. when the pressure in the ignition chamber is low, for instance before combustion begins, the pressure at the pressure-responsive element 46 will be low. On the other hand, when the pressure in the ignition chamber rises due to combustion taking place therein, the pressure at the pressure-responsive element will be considerably higher. Thus the pressure-responsive element will be subjected to the pressure in the ignition chamber, although it is not subjected to the great heat which prevails in that chamber but only to the comparatively low temperature of the steam and oxygen mixture.

The ignition chamber 13 is of annular form and is arranged in a plane transverse to the main axis of the combustion chamber 10. It lies in front of the combustion chamber, and communicates with it through axial passages 47. Spaced around the wall of the combustion chamber are two sets of injectors 48 and 49 arranged alternately, each set being adapted to inject both fuel and hydrogen peroxide into the combustion chamber in considerable quanity. One set of injectors 48 constitutes a first stage, while the other set 49 constitutes a second stage.

The hydrogen peroxide flow may be summarized as follows. From the tank it passes by way of pipe 14 through its pump 15 and shortly afterwards passes the tapping 32, control valve 33 and T-junction 34 going to the steam generator, and a pipe 50 leading to the hydrogen peroxide priming ejector 39. The main supply of hydrogen peroxide then passes through a pressure-sensitive flow control valve 51 after which it flows through the pipe 17 into the cooling jacket 18 surrounding the combustion chamber and the ignition chamber. On leaving this jacket the hydrogen peroxide passes through the pipe 19 to the peroxide part of the main regulating valve 12, whence it can pass to the first stage and second stage injectors of the combustion chamber through pipes 52 and 53 respectively. A dump valve 54 is provided for emptying hydrogen peroxide from the cooling jacket whenever the propulsion unit is shut down, so as to prevent excessive heat absorption by the residual coolant, which might be dangerous. The auxiliary hydrogen peroxide supplies to the steam generator through the tapping 32 and to the priming ejector through the pipe 50 have been described above.

The fuel supply is as follows. From the tank fuel goes to the fuel pump 21 and is forced through pipe 22, then after passing the entrance to a tapping 55 leading to the fuel priming ejector 40 the fuel goes through a pressure-sensitive flow control valve 56 and on through the pipe 23 to a junction 57. One branch from this junction communicates with an igniting fuel valve 58, which when open admits fuel to the ignition chamber through the pipe 28. The other branch communicates with a valve 59, termed the pressure-responsive valve, which is actuated by the aforesaid pressure-responsive element 46. This valve opens when the pressure has risen sufficiently in the ignition chamber and admits fuel to the fuel part of the main regulating valve 12. From this part of the main regulating valve, when it is suitably set, fuel can pass to the first stage and second stage injectors 48 and 49 of the combustion chamber through pipes 60 and 61 respectively.

There are two distinct control devices operated by the pilot for regulating the propulsion unit. The first control is merely a starter button 62 which will open the starting valve 31 between the upper and lower vessels of the steam generator 26 to initiate the production of the steam and oxygen mixture and so to start the turbine and pump unit. The other control is the manual igniting and thrust regulating control lever 38. In the first place this control lever sets the governor 36 of the turbine and pump unit, and thus controls the speed of this unit in the manner described. This control also actuates the igniting fuel valve 58, so that when the lever is moved to the igniting position 63 it will open this valve and allow fuel to enter the ignition chamber. This control also acts on the main regulating valve 12 to control the admission of both fuel and hydrogen peroxide to the combustion chamber.

Conveniently the igniting fuel valve 58 and the pressure-responsive valve 59 are incorporated in the same body as the main regulating valve 12. The complete valve assembly is shown in Figures 3 and 4, in which Figure 3 is a section showing the control valve actuated by the pilot's lever 38, the fuel admission valve, the pressure-responsive valve and the igniting fuel valve, and Figure 4 is another section which shows the control valve actuated by the pilot's lever 38, the fuel admission valve and the hydrogen peroxide admission valve.

The valve assembly comprises a housing or body 64 in which are three parallel bores 65, 66 and 67. The bore 65 accommodates an immovable ported sleeve 68 within which can slide a ported sleeve valve 69 constituting a pressure-actuated fuel admission valve, while within the bore of the sleeve valve 69 there is a longitudinally movable valve 70 which constitutes the control valve actuated in response to movements of the pilot's lever 38. These movements are transmitted to the valve 70 through a rocking arm 71 (Figure 4) which bears on a projection at one end of the valve and which is connected to the lever 38 by a suitable linkage as shown diagrammatically in Figure 1. Thus movements of the lever 38 cause corresponding movements of the arm 71, and hence move the valve 70 axially in relation to the body 64.

The bore 66 accommodates immovable ported sleeves 72 and 73. In the former can slide a valve member 74 constituting the pressure responsive valve 59 of Figure 1, while in the latter can slide a valve member 75 constituting the igniting fuel valve 58 of Figure 1. The valve member 75 can be lifted from its seat in the ported sleeve 73 by an arm 76 (see Figure 1) which is connected to the pilot's control lever 38 and which bears against a projection 77 (Figure 3) extending from one end of this valve member. The valve members 74 and 75 are both pressed against their seats in the ported sleeves 72 and 73 respectively by means of a compression spring 78. Bearing against the left hand end of an intermediate member 74ᴬ which contacts the left hand end of the valve member 74 is a projection 79 extending from a piston 80 which is slidable in a cylinder 81. The space to the left of this piston communicates through a fitting 82 with the auxiliary bleed 45 from the pipe 27 and with the ignition chamber 13 (see Figure 1). The parts 79 to 82 constitute the pressure responsive element 46.

Fuel is admitted to the bore 66 through a port 66ᴬ communicating with the space between the valve members 74 and 75 occupied by the spring 78. This space corresponds to the junction 57 of Figure 1.

The bore 67 (see Figure 4) accommodates an immovable ported sleeve 83 within which can slide a hollow valve element 84 constituting the hydrogen peroxide admission valve. Extending from this valve element is a piston rod 85, the outer end of which is pivoted at 85ᴬ to one end of a lever 86 which can rock about a fixed pivot 87. The other end of this lever is pivotally connected by a pin 88 to the sleeve valve 69, so that any movement of this sleeve valve is accompanied by a corresponding movement of the valve member 84 in the opposite direction. The pin 88 passes through a slot 89 in the valve member 70 which permits relative movement between the sleeve valve 69 and the valve member 70. The hydrogen peroxide admission valve 84 is provided with an external groove 90 which is in communication with the hollow interior of the valve. The hollow interior of the valve in turn communicates with a chamber 91 to which the hydrogen peroxide is supplied from the pipe 19 (Figure 1). A port 92 in the ported sleeve 83 communicates with the pipe 52 leading to the first stage injectors, while a port 93 communicates with the pipe 53 leading to the second stage injectors.

The apparatus is set into operation as follows. First of all the pilot moves his lever 38 into a starting position 63a which sets the governor 36 in an idling position. He next pulls the starter button 62 which opens the starting valve 31 and allows hydrogen peroxide to flow by gravity from the upper vessel 30 of the steam generator into the lower vessel 29 where it is immediately decomposed by the catalytic stones into a mixture of steam and oxygen. Some of this mixture flows to the priming ejectors 39 and 40 and primes both the pumps 15 and 21. At the same time some of the mixture flows to the turbine 25 and begins to drive the pumps. Fuel and hydrogen peroxide are then pumped as far as their respective pressure sensitive flow control valves 56 and 51, and as soon as the pumps have speeded up to give a sufficient output the pressure will open these valves. Fuel will then fill the pipe 23 as far as the space containing the spring 78, which space is closed by the valve member 75 of the igniting fuel valve 58 and the valve member 74 of the pressure responsive valve 59. Hydrogen peroxide will fill the pipe 17, the cooling jacket 18 and the pipe 19. It will also pass into the lower vessel 29 of the steam generator, so that the starter button 62 can be released without interrupting the steam generation.

A slight further movement of the pilot's control lever 38 to the igniting position 63 moves the valve member 75 from its seat, permitting fuel under pressure to pass into a passage 94 and thence through a port 94ᴬ to the pipe 28 (Figure 1) leading to the ignition chamber. Before this occurs, however, some of the steam and oxygen mixture at about 500° C. will already have begun to enter the ignition chamber through the flow control valve 43 and the pipe 27. This desired order of precedence of the flows into the ignition chamber can be ensured by the relative pressure settings of the pressure sensitive flow control valve 56 in the fuel line and the pressure sensitive flow control valve 43 in the steam and oxygen line 27.

When combustion has begun in the ignition chamber hot gases will emerge therefrom into the combustion chamber in readiness for igniting the main propellants. Also a pressure will be built up in the ignition chamber so that the piston 80 of the pressure-sensitive element 46 will be forced to the right, thus moving the valve member 74 from its seating and allowing fuel under pressure to enter a passage 95. This passage communicates through ports 95ᴬ in the immovable sleeve 68 and ports 95ᴮ in the sleeve valve 69 with a chamber 96 around the valve 70. Near its left hand end the valve 70 is provided with a narrow land 97 which normally registers with ports 98 through the walls of the sleeve valve 69. These ports communicate with a chamber 99ᴬ to the right of a piston member 99 formed on the left hand end of the sleeve valve 69. The said movement of the pilot's control lever 38 into the igniting position 63 moves the valve 70 from its original position for a short distance to the left as seen in Figures 3 and 4 causing the land 97 to uncover the ports 98 and admit fuel under pressure to the right hand surface of the piston 99. This causes the sleeve valve 69 to move to the left by a distance equal to the movement of the valve 70, until the port 98 is again completely closed by the land 97. Thus the sleeve valve 69 constitutes a follow-up member which exactly follows the movements of the valve 70, these movements being effected by the pressure of the fuel. Also, by reason of the mechanical connection between the sleeve valve 69 and the hydrogen peroxide admission valve 84, the movements of the former are accompanied by corresponding movements of the latter in the opposite direction. If the valve 70 is moved to the right, the port 98 is exposed to the left of the land 97, permitting fuel to escape from the chamber 99ᴬ into a space 99ᴮ and thence out through a drain 99ᶜ back to the fuel tank. A spring 99ᴰ in the space 99ᴮ then forces the piston 99 and the sleeve valve 69 to the right, following exactly the movement of the valve 70.

A short movement to the left of the sleeve valve 69 following a similar movement of the valve 70 will bring a groove 100 of the sleeve valve 69 into register with a port 101 in the ported sleeve 68. The port 101 communicates with the pipe 60 leading to the first stage injectors, and so fuel under pressure will pass to these injectors. The corresponding movement of the hydrogen peroxide admission valve 84 will brirng its left hand end clear of the port 92 and so will permit hydrogen peroxide to pass to the first stage injectors through the pipe 52.

It will be appreciated that since the sleeve valve 69 and the hydrogen peroxide admission valve 84 are mechanically connected together the injection of fuel and hydrogen peroxide can be timed to begin simultaneously.

The fuel and hydrogen peroxide injected into the combustion chamber will be ignited by the combustion products issuing from the ignition chamber, producing large volumes of hot gases which issue from the nozzle 11 with propulsive effect.

The movement of the pilot's control lever 38 into the igniting position 63 will also have increased the governor setting so as to increase the output of the pumps to maintain an adequate supply of propellants. It will be appreciated that premature movement of the lever 38 into the igniting position 63 does not matter, since no propellants can pass from the main regulating valve into the combustion chamber until the reaction in the ignition chamber has proceeded sufficiently to cause the pressure responsive valve 59 to open.

If it is desired to increase the thrust, a further movement of the pilot's lever 38 will move the valve 70 further to the left, followed by a corresponding movement of the sleeve valve 69 which will eventually bring a groove 102 therein into register with a port 103 in the ported sleeve 68. This port 103 communicates with the second stage injectors 49 through the pipe 61. The corresponding movement of the hydrogen peroxide admission valve 84 will bring the groove 90 into register with the port 93 and so will allow hydrogen peroxide to pass to the second stage injectors 49. The porting arrangements are such that injection through the first stage injectors will continue during injection through the second stage injectors.

The propulsion unit described can readily be constructed in two parts, namely a power section which consists of the combustion chambers and associated parts, and a pump section which includes the turbine 25, the pumps 15 and 21, the steam generator 26 and some of the valves. These two sections may be located in different parts of the aircraft and connected together by piping.

While the invention has been described more particularly in relation to the use of hydrogen peroxide as the oxidizer and for ignition, it will be appreciated that other suitable substances may be employed. The substances used for ignition need not necessarily be self-igniting, but if they are not it will be necessary to provide an ignition device such as a spark plug in the ignition chamber.

What we claim as our invention and desire to secure by Letters Patent is:

1. A rocket motor comprising a combustion chamber, a propulsion nozzle extending rearwardly from said combustion chamber, pumps for pumping non-self-igniting propellants into said combustion chamber for gas-generating reaction therein, at least one gas-driven motor for driving said pumps, means for generating a hot gas containing free oxygen for motivating said driving motor, an ignition chamber, means for introducing a portion of said hot oxygen-containing gas and a fuel into said ignition chamber for ignition and combustion therein, and means defining a passage for conveying hot combustion products from said ignition chamber into said combustion chamber for igniting said propellants.

2. A rocket motor as claimed in claim 1 in which the means for generating said oxygen-containing gas comprises means for bringing hydrogen peroxide into contact with a catalyst which causes the hydrogen peroxide to decompose into a mixture of steam and oxygen.

3. A rocket motor as claimed in claim 1 which includes a member sensitive to the pressure in the ignition chamber and a valve actuated by said member for preventing the introduction of the propellants into said combustion chamber until a pre-determined pressure has been built up in the ignition chamber.

4. A rocket motor as claimed in claim 1 in which the fuel admitted to said ignition chamber is the same as one of the propellants admitted to said combustion chamber.

5. In a rocket motor comprising a combustion chamber, a propulsion nozzle extending rearwardly from said combustion chamber, and pumps for pumping non-self-igniting propellants through conduits leading to said combustion chamber, the combination of at least one gas-driven motor for driving said pumps, means for generating a hot gas containing oxygen for motivating said driving motor, an ignition chamber, means for introducing a portion of said oxygen-containing gas and a fuel into said ignition chamber for ignition and combustion therein, means defining a passage for conveying hot combustion products from said ignition chamber into said combustion chamber, a valve in one of said propellant conduits, actuating means for said valve responsive to the pressure in the ignition chamber and arranged to open said valve only when the pressure in the ignition chamber has been built up to a pre-determined value, a regulating valve in said conduit between said first mentioned valve and said main combustion chamber, a pressure-sensitive actuating element for opening said regulating valve by the pressure of propellant thereon, a control member, means connected to said control member for admitting propellant to said pressure-sensitive element to open said regulating valve to an extent determined by the setting of said control member, another regulating valve in another of said propellant conduits, and interconnecting means between said regulating valves whereby they are actuated simultaneously.

6. A rocket motor as claimed in claim 5 including a valve for controlling the admission of fuel into said ignition chamber and an operating connection between said valve and said control member.

7. A rocket motor as claimed in claim 3 which includes a by-pass conduit from the free oxygen containing gas generating means to the ignition chamber, the pressure sensitive member being disposed in said conduit for actuating said valve to admit fuel to said combustion chamber upon the building up of pressure in said ignition chamber.

References Cited in the file of this patent

UNITED STATES PATENTS

| | | |
|---|---|---|
| 2,325,619 | Lysholm | Aug. 3, 1943 |
| 2,408,111 | Truax | Sept. 24, 1946 |
| 2,422,213 | Smith | June 17, 1947 |
| 2,523,656 | Goddard | Sept. 26, 1950 |
| 2,560,118 | Malone | July 10, 1951 |

OTHER REFERENCES

"Liquid Propellant Rocket Power Plants" (Zucrow), Journal of the American Rocket Society, Number 72, December 1947 (pages 26–31 relied on).